United States Patent [19]

Kinsman

[11] 4,125,686

[45] Nov. 14, 1978

[54] LAMINAR CELLS AND METHODS FOR MAKING THE SAME

[75] Inventor: Gordon F. Kinsman, Billerica, Mass.

[73] Assignee: Polaroid Corporation, Cambridge, Mass.

[21] Appl. No.: 811,470

[22] Filed: Jun. 30, 1977

[51] Int. Cl.² .......................................... H01M 6/12
[52] U.S. Cl. .................................... 429/152; 429/162
[58] Field of Search ............... 429/162, 152, 149, 153, 429/156, 160, 122, 154

[56] References Cited

U.S. PATENT DOCUMENTS

| 3,734,780 | 5/1973 | Bilhorn et al. ..................... 429/162 |
| 4,007,472 | 2/1977 | Land .............................. 429/162 X |
| 4,047,289 | 9/1977 | Wolff ............................. 429/162 X |

Primary Examiner—Anthony Skapars
Attorney, Agent, or Firm—John W. Ericson

[57] ABSTRACT

The method of making a laminar battery including the steps of contacting the cellophane side of a laminate of cellophane and zinc powder adhered to the cellophane with a polymeric binder with a cathode slurry of carbon and manganese dioxide in an aqueous solution of electrolytes, coating the zinc side of the laminate with a carbon slurry, and contacting the carbon slurry with a conductive plastic current collector, and cells and batteries made by this process.

2 Claims, 2 Drawing Figures

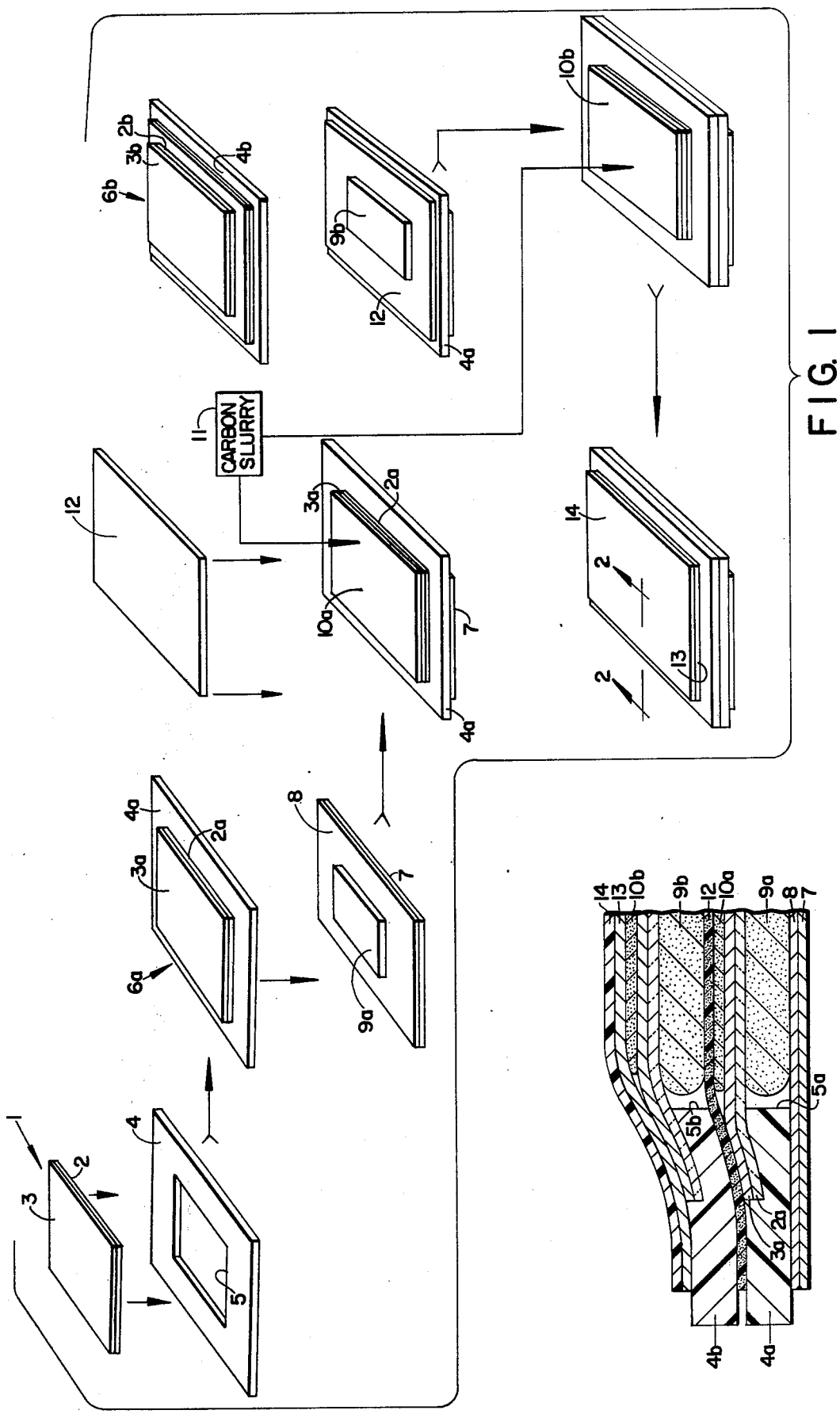

LAMINAR CELLS AND METHODS FOR MAKING THE SAME

This invention relates to electrical cells and batteries, and particularly to novel methods of making laminar cells and batteries, and cells and batteries made thereby.

In copending U.S. application Ser. No. 811,469 filed concurrently with this application by Stanley M. Bloom, Charles K. Chiklis and Gordon F. Kinsman for Electrical Cells and Batteries and Methods of Making the Same, a process is described for manufacturing a laminate of zinc and cellophane. The process basically consists in coating the cellophane with a dispersion of zinc powder in a solution of an elastomer in an organic solvent, and then drying the coating to remove the solvent to produce a thin layer of zinc powder on the cellophane that is adhered to the cellophane by the elastomer. In application Ser. No. 811,469 there is described a further process of overcoating the zinc side of this laminate with conductive plastic from a dispersion of carbon in an organic solution of the elastomer, then drying the coating to remove that solvent. Electrical cells and batteries may be made with the use of this triplex laminate in the manner described in the above cited application Ser. No. 811,469.

The object of this invention is to facilitate the manufacture of laminar batteries using a cellophane zinc laminate of the type described in the above cited application Ser. No. 811,469, but without the conductive plastic coating. Briefly, this invention is organized about the discovery that a zinc anode layer initially adhered to a cellophane substrate can be effectively electronically coupled to an independent conductive plastic current collector or intercell connector through an intermediate slurry of carbon and water. Briefly, the process of making cells and batteries in accordance with the invention requires as starting materials the cellophane and zinc laminate just described, sheets of conductive plastic as intercell connectors, frames of thermoplastic insulating material, and terminal stock comprising thin sheet metal laminated to conductive plastic sheets. Other materials required are cathode slurries, consisting of electrode particles dispersed in an aqueous electrolytes, and a carbon slurry consisting essentially of carbon black and water. The manner in which these elements may be assembled into cells and batteries in accordance with the invention will best be understood in the light of the following detailed description, together with the accompanying drawings, of an illustrative and presently preferred embodiment of the invention.

In the drawings,

FIG. 1 is a schematic exploded perspective sketch and flow diagram illustrating the assembly of a two cell battery in accordance with the invention; and FIG. 2 is a schematic fragmentary cross sectional elevational sketch, with parts broken away, taken essentially along the lines 2—2 in FIG. 1 and illustrating the internal construction of the completed battery in more detail.

Referring to FIG. 1, there is shown a laminate generally designated 1, of which one is required for each cell in the battery to be made. The laminate consists of a sheet of cellophane 2 coated with a layer of zinc 3, as by the process described in more detail in the above cited application Ser. No. 811,469. Briefly, the process consists in making a zinc coating composition by dispersing zinc powder, and preferably a small amount of carbon black, in a solution of an elastomer in an organic solvent.

Compositions that have been found especially successful for use as the zinc coating composition are described in copending U.S. application Ser. No. 811,471 filed concurrently with this application by Charles K. Chiklis for Conductive Compositions and Coating Compositions For Making The Same, and assigned to the assignee of this application.

The presently preferred one of these coating compositions is as follows, in percent by weight based on the total weight of composition:

| | |
|---|---|
| Toluene | 36.8 |
| Powdered Zinc | 56.9 |
| Polymeric Binder | 4.6 |
| Carbon Black | 1.7 |
| | 100.00 |

In the above composition, powdered zinc that has been used is NJ74, as sold by the New Jersey Zinc Co. of New York, N.Y. The polymeric binder was a teleblock copolymer of 70 parts by weight of butadiene and 30 parts by weight of styrene based on the total weight of copolymer and sold as Solprene 411C by Phillips Petroleum Co. The carbon black was Shawinigan Black, as made and sold by Shawinigan Products Corp. of New York, N.Y.

This composition is coated on the cellophane sheet, and dried to remove the solvent, to a dry thickness of from ½ to 1½ mils, and preferably to about 1 mil in thickness. The cellophane used may be of any regenerated cellulose free of humectants and plactizers, and particularly, free of glycerine, and for example, may be PUD-O cellophane 1.34 mils in thickness as made by E. I. Du Pont de Nemours & Co. of Wilmington, Del.

The laminate 1 forms a combination separator and anode which is preferably prelaminated to a thermoplastic insulating frame 4, as by moderate heat and pressure, to temporarily adhere the cellophane 2 to the sheet 4 over a central opening 5 in the frame 4 defining as active electrode area. The sheet 4 may be, for example, Versalon 1140 polyamide hot melt adhesive, as made and sold by General Mills, Inc. of Minneapolis, Minn. Typically, the frame 4 may be from 18 to 24 mils in thickness.

One of the subassemblies made as just described is shown at 6a in FIG. 1, its components being identified by their original reference characters with the suffix a. This subassembly 6a is placed over a cathode subassembly comprising a sheet metal terminal 7 which may, for example, be of tinned steel, aluminum or the like about 2 mils in thickness, to which there is prelaminated a sheet of conductive plastic 8, such as the conductive vinyl film sold under the trademark Condulon by Pervel Industries, Inc., and about 2 mils in thickness.

On the conductive plastic sheet 8 is deposited, by extrusion, for example, a layer 9 of cathode mix, which may be any desired dispersion of cathode particles in an electrolyte, but most preferably is a dispersion of manganese dioxide and carbon black in an aqueous solution of electrolytes. A particular cathode slurry composition that is presently preferred is as follows, in percent by weight based on the total weight of slurry:

| | |
|---|---|
| $MnO_2$ | 48.5 |
| Shawinigan Black | 6.2 |
| $H_2O$ | 28.2 |

| | |
|---|---|
| NH$_4$Cl | 9.7 |
| ZnCl$_2$ | 4.4 |
| HgCl$_2$ | 2.0 |

This slurry may be deposited to a weight of 0.07 to 0.15 grams per square centimeter in the typical practice of the invention.

Comparing FIGS. 1 and 2, the subassembly 6a is put down over the cathode end cell assembly with the cathode slurry 9a in registry with the opening 5a in the frame 4a and in contact with the cellophane separator 2a. Aqueous electrolyte from the cathode slurry layer 9a will now begin to permeate the cellophane separator 2a, wetting out and swelling the cellophane and permeating and wetting out the anode layer 3a of zinc powder bound with elastomer. In this process, the initial bond between the frame 4a and the cellophane 2a will be weakened, and the bonds between the zinc-binder layer and the cellophane 2a will be weakened, but the cellophane will remain in intimate contact with the zinc layer 3a without wrinkling, much as described in the above cited application Ser. No. 811,469. It has been found that the presence or absence of a coating of conductive plastic over the zinc does not affect this result.

Referring again to FIG. 1, there is next added to the subassembly formed by combining the framed duplex 6a with the cathode end terminal a layer of carbon slurry 10a on the surface of the zinc side of the duplex 3a from a suitable container of carbon slurry 11, as with the aid of a spatula. The carbon slurry may simply be a dispersion of carbon black, preferably Shawinigan Black, in water; for example, a dispersion of 5 percent by weight of carbon black based on the total weight of slurry.

Over this wet carbon slurry layer is added a conductive plastic intercell connector 12 which has major dimensions larger than the dimensions of the duplex 2a and 3a and slightly smaller than the dimensions of the frame 4a. The intercell connector 12 may be of the same material and thickness as the cathode collector 8 described above. The intercell connector 12 may now be heat sealed to the borders of the frame 4a to complete the first cell.

Over the conductive plastic intercell connector 12 is next extruded a second layer of cathode slurry 9b, corresponding in size and weight to the first slurry layer 9a. Next, a second subassembly 6b such as the subassembly 6a described above is added, and may there be heat sealed to the surface of the conductive plastic intercell connector 12, and if desired to surrounding borders of the frame 4a.

The zinc layer 3b on the assembly 6b is next supplied with a layer of carbon slurry 10b from the supply container 11 in the same manner as the layer 10a described above. An end cell terminal is then added, comprising a sheet of conductive plastic 13 prelaminated to a sheet metal end terminal 14. The sheets 13 and 14 may be of the same materials and thicknesses as the sheets 7 and 8 described above.

FIG. 2 illustrates a battery made in the manner just described after sealing, which is accomplished by heat and pressure applied to the periphery of the battery in a conventional manner, and effects a marginal peripheral depression as suggested in FIG. 2. Certain additional features not illustrated or described may be provided in accordance with conventional practice, as will be understood by those skilled in the art. In particular, the battery may be manufactured on an insulating carrier web, sealed with the aid of a glassine overwrap, and provided with an end terminal extension on one terminal that can be folded around to bring that terminal into essentially the same plane as the other terminal, all as more fully shown and described in U.S. Pat. No. 4,019,251, issued on Apr. 26, 1977 to Thomas P. McCole for Flat Battery and Method of Manufacture and assigned to the assignee of the application.

It will be apparent from the above description that portions of the salts in the cathode slurries will diffuse into the anode sides of the cells. Thus, when the cells come to equilibrium after assembly, the anode liquid, or anolyte, will comprise an aqueous solution of electrolytes distributed in the interstices of the zinc/elastomer layer and the carbon slurry stratum.

The particular embodiment of the invention described above is presently preferred. It may be noted in this regard that for photographic purposes, such as those described in the above cited application Ser. No. 647,599, a four cell construction is presently preferred. Although a two cell battery is here shown for simplicity, the manner in which additional cells can be added will be apparent from the above description.

Since carbon particles are relied on in the carbon slurries of the invention essentially for their electrical conductivity and not for any chemical or electrochemical function peculiar to Leclanche cells, it will be apparent that in its broader aspects, the invention is applicable to the construction of any electrical cell in which an electrode layer is prelaminated to a separator and is to be conductively connected to a superposed electrically conductive layer such as a current collector or intercell connector.

The following example is illustrative of the practice of the invention:

EXAMPLE I

Two four-cell batteries were made in the manner described above, using four duplex elements 1 each 3.03 by 2.35 inches, four 3.5 gram cathode slurry patches each 1.87 by 2.53 inches and of the composition given above 1 and four 24 mil Versalon 1140 frames with inside dimensions of 2.73 by 2.80 inches and outside dimensions of 2.87 by 3.53 inches. These batteries, identified as Examples IA and IB below, were tested for open circuit voltage (OCV) and closed circuit voltage (CCV) with a fixed load of 3.3 ohms for 0.1 seconds. Immediately after electrochemical assembly (ECA), the battery of Example IA had $OCV=7.27$ volts and $CCV=6.37$ volts. After 30 minutes, the values were $OCV=6.99$ volts, $CCV=6.26$ volts. The battery of Example IIA had values of $OCV=7.28$ volts and $CCV=6.29$ at ECA, and $OCV=6.62$ volts, $CCV=5.93$ volts 17 hours after ECA.

The battery of Example IA was tested for its ability to recharge an electronic flash unit while operating an automatic camera. For this test, an SX-70 Land camera was fitted with an electronic flash unit having a light output of about 37 watt seconds, and an input energy requirement of about 80 watt seconds. The flash unit was connected to be charged from the battery under test. The battery was also used to energize the camera to perform the functions of exposure control and film advance in the normal manner, except that, experience having shown that advancing film units through the processing rolls made no detectable difference in the test, no film units were employed. In the test, the initially discharged flash unit is charged until its ready light glows. The shutter button of the camera is then operated, causing the camera to go through its cycle, during which time the flash unit is discharged. The battery is then electrically disconnected, and allowed 30 seconds to recover. This cycle is estimated to require a total energy of about 90 to 100 watt seconds, and was repeated until the battery failed to recharge the flash unit. The battery of Example IA carried out 23 such cycles.

While the invention has been described with respect to the details of a presently preferred embodiment, many changes and variations will occur to those skilled in the art upon reading this description. Such can obviously be made without departing from the scope of the invention.

Having thus described the invention, what is claimed is:

1. In an electrical cell, the combination comprising a thin sheet of ion permeable separator material; a first electrolyte permeable layer of active electrode particles held together with a polymeric binder on said separator sheet; said first layer having aqueous electrolyte distributed therein; a layer comprising a dispersion of carbon particles in aqueous electrolyte on said first layer, and a conductive plastic sheet over and in contact with said second layer.

2. In an electrical cell, the combination comprising a thin separator sheet of regenerated cellulose, a first electrolyte permeable layer of active electrode particles held together with a polymeric binder on said separator sheet, said first layer having aqueous electrolyte distributed therein, a layer comprising a dispersion of carbon particles in aqueous electrolyte carried on said first layer, and a conductive plastic sheet over and in contact with said second layer.

* * * * *